US009651053B2

(12) United States Patent
Eleftheriou et al.

(10) Patent No.: US 9,651,053 B2
(45) Date of Patent: May 16, 2017

(54) BLEED VALVE

(71) Applicant: Pratt & Whitney Canada Corp., Longueuil (CA)

(72) Inventors: Andreas Eleftheriou, Woodbridge (CA); Richard Ivakitch, Mississauga (CA); David Denis, Burlington (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 639 days.

(21) Appl. No.: 14/163,678

(22) Filed: Jan. 24, 2014

(65) Prior Publication Data
US 2015/0211540 A1 Jul. 30, 2015

(51) Int. Cl.
*F04D 27/02* (2006.01)
*F04D 29/54* (2006.01)
*F01D 17/10* (2006.01)
*F02C 6/08* (2006.01)

(52) U.S. Cl.
CPC ....... *F04D 27/0215* (2013.01); *F01D 17/105* (2013.01); *F02C 6/08* (2013.01); *F04D 27/023* (2013.01); *F04D 29/545* (2013.01)

(58) Field of Classification Search
CPC ...... F04D 27/0215; F04D 29/56; F02B 37/18; F02C 9/18; F01L 1/04
USPC ............ 137/15.23, 315.22; 384/28; 251/294, 251/305; 415/150, 157
See application file for complete search history.

(56) References Cited

U.S. PATENT DOCUMENTS

| 3,990,809 | A |   | 11/1976 | Young et al. |              |
|-----------|---|---|---------|--------------|--------------|
| 4,409,788 | A | * | 10/1983 | Nash         | F02K 1/822   |
|           |   |   |         |              | 415/157      |
| 4,629,105 | A | * | 12/1986 | Grenon       | B65H 51/10   |
|           |   |   |         |              | 226/176      |
| 4,827,713 | A | * | 5/1989  | Peterson     | F01D 17/105  |
|           |   |   |         |              | 415/150      |
| 5,380,151 | A | * | 1/1995  | Kostka       | F04D 27/0215 |
|           |   |   |         |              | 415/145      |
| 5,687,562 | A | * | 11/1997 | Stewart      | F01D 17/105  |
|           |   |   |         |              | 251/304      |

(Continued)

FOREIGN PATENT DOCUMENTS

EP 2317081 12/2012
SU 667626 A1 * 6/1979

*Primary Examiner* — Thai Ba Trieu
*Assistant Examiner* — Shafiq Mian
(74) *Attorney, Agent, or Firm* — Norton Rose Fulbright Canada

(57) ABSTRACT

A bleed valve having a piston with a sealing member, the piston being displaceable between a first position to seal an aperture of a fluid conduit and an opposed second position spaced apart from the aperture to allow the working fluid therethrough. The bleed valve also has a guiding assembly with at least one guide wheel mounted to the piston and being displaceable therewith along a guide rail. The guide wheel has a guide groove extending inwardly from an outer rolling surface. The guide rail has a rail surface with a guide protrusion. The guide groove and the guide protrusion are complementary and in rolling contact with one another. The bleed valve also has a displacement mechanism for displacing the piston between the first and second positions. A compressor with a bleed valve and method for controlling bleeding of a working fluid are also discussed.

19 Claims, 5 Drawing Sheets

(56) References Cited

U.S. PATENT DOCUMENTS

| | | | |
|---|---|---|---|
| 6,212,770 B1* | 4/2001 | Honda | F01D 17/00 |
| | | | 29/458 |
| 6,405,535 B1* | 6/2002 | McEwan | F01D 17/105 |
| | | | 251/62 |
| 6,755,025 B2* | 6/2004 | Eleftheriou | F01D 17/105 |
| | | | 60/795 |
| 7,594,403 B2* | 9/2009 | Cadieux | F04D 27/0215 |
| | | | 60/782 |
| 7,670,107 B2 | 3/2010 | Barthelet et al. | |
| 7,828,516 B2 | 11/2010 | Hartmann et al. | |
| 8,418,667 B2* | 4/2013 | Nendel | F01L 13/0036 |
| | | | 123/90.16 |
| 2004/0016238 A1* | 1/2004 | Eleftheriou | F01D 17/105 |
| | | | 60/785 |
| 2005/0008476 A1* | 1/2005 | Eleftheriou | F01D 17/105 |
| | | | 415/144 |
| 2007/0113806 A1* | 5/2007 | Ezaki | F01L 1/04 |
| | | | 123/90.16 |
| 2009/0320498 A1* | 12/2009 | Blanchard | F01D 9/06 |
| | | | 60/785 |
| 2010/0316489 A1 | 12/2010 | Hoecker et al. | |
| 2011/0011085 A1* | 1/2011 | Garrett | F01D 17/143 |
| | | | 60/615 |
| 2013/0343883 A1* | 12/2013 | LeBlanc | F01D 17/105 |
| | | | 415/182.1 |

* cited by examiner

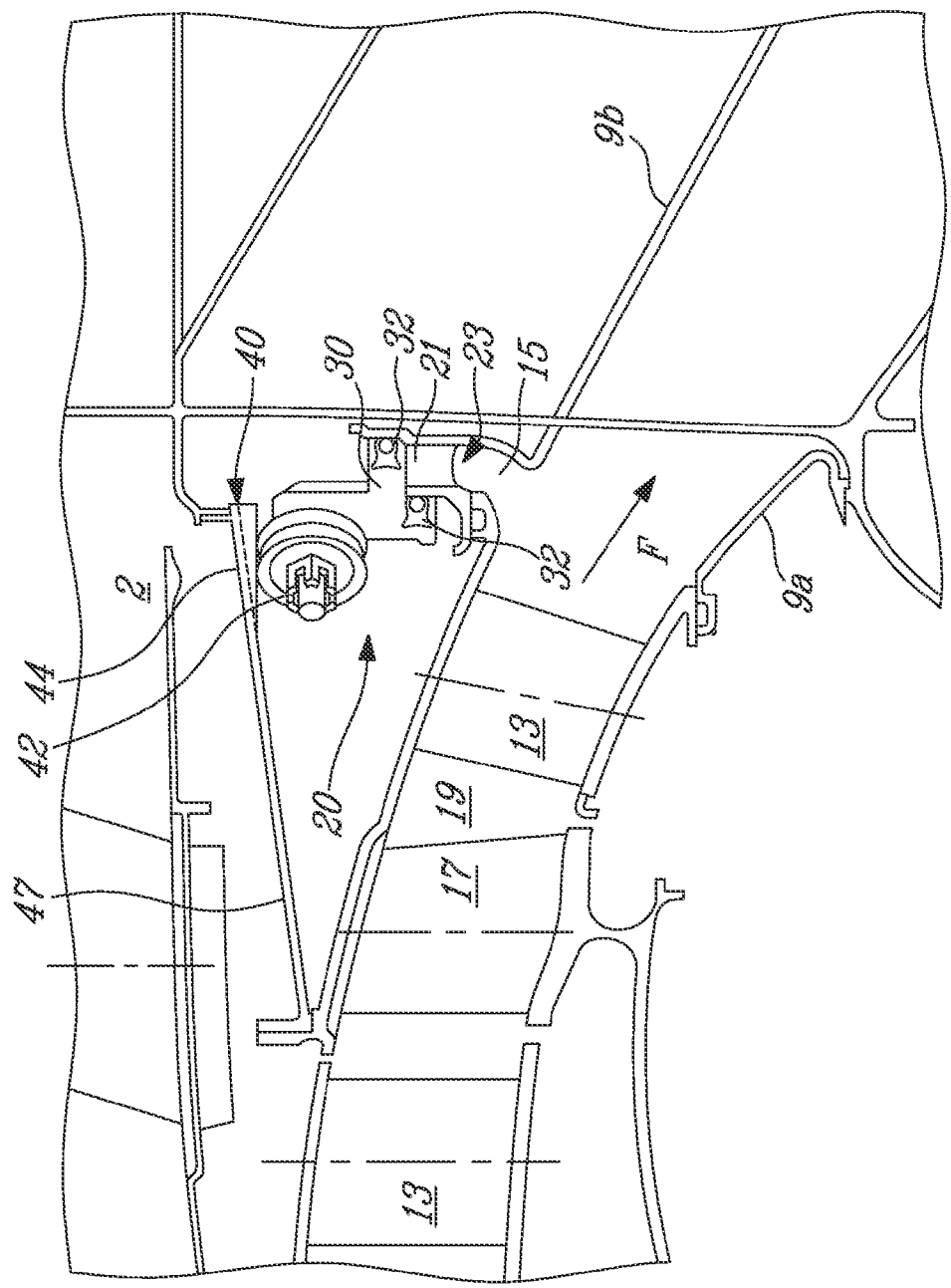

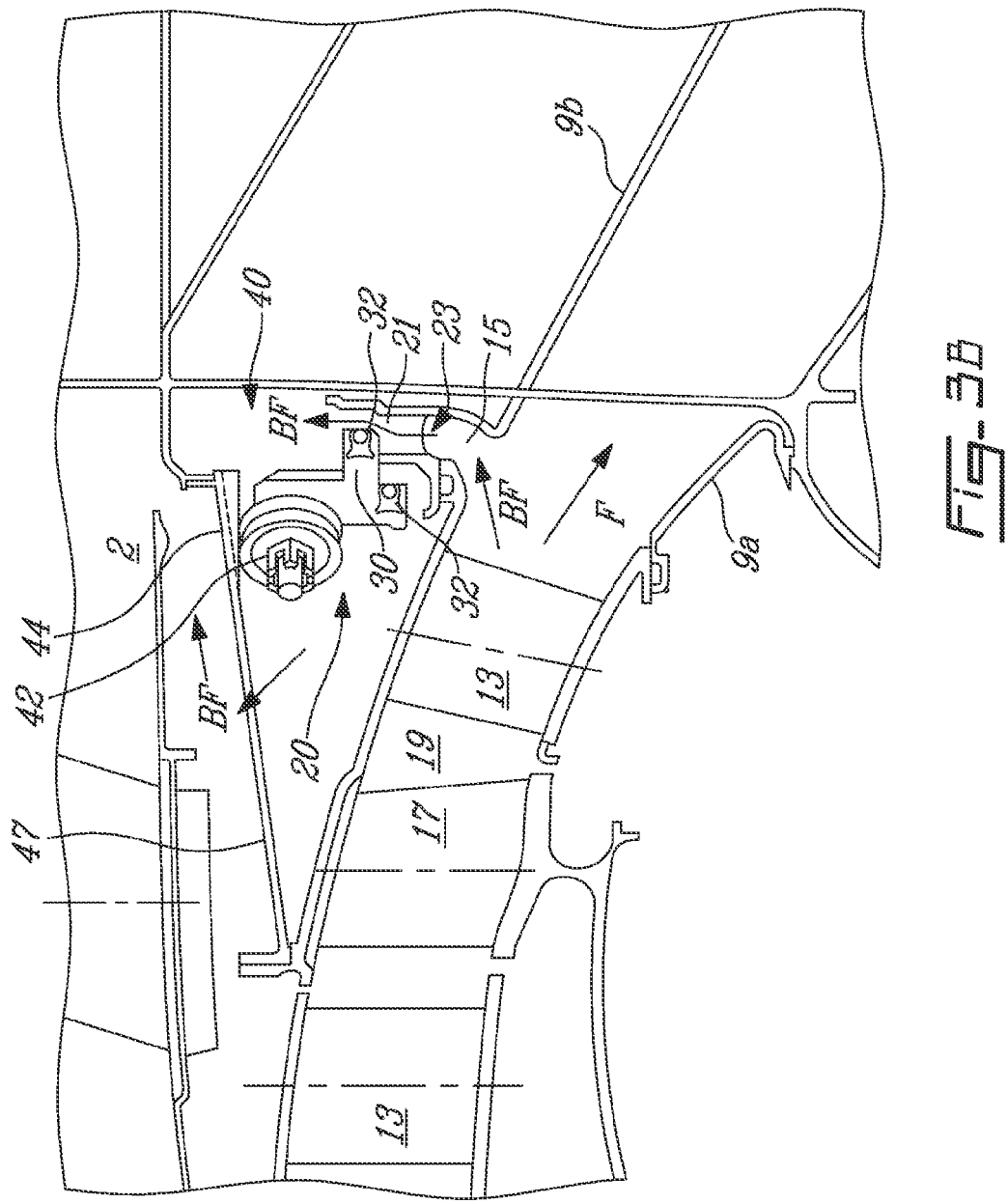

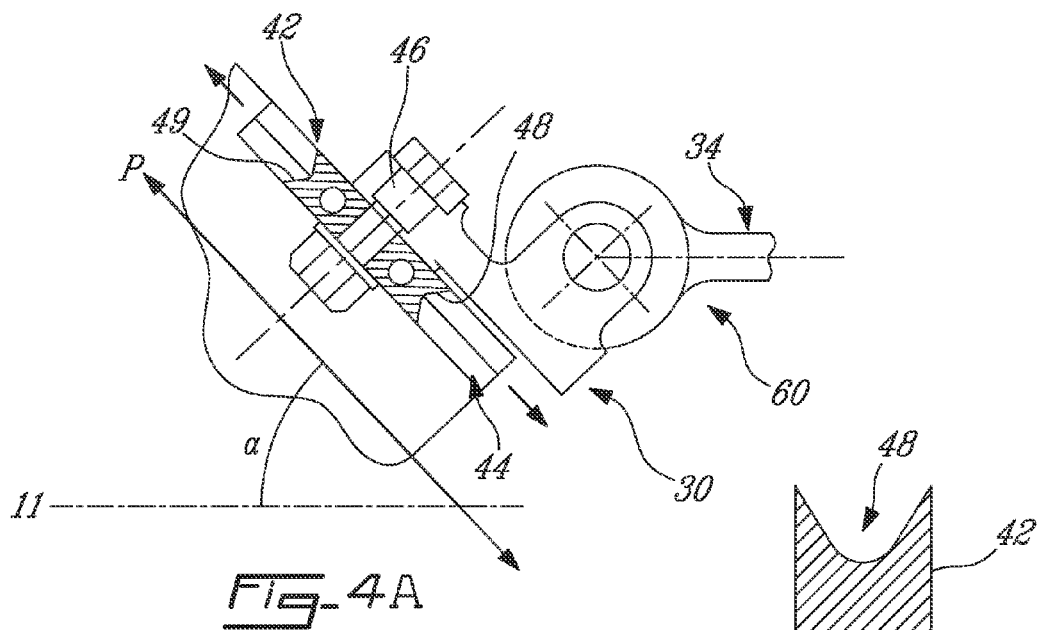
FIG-4A
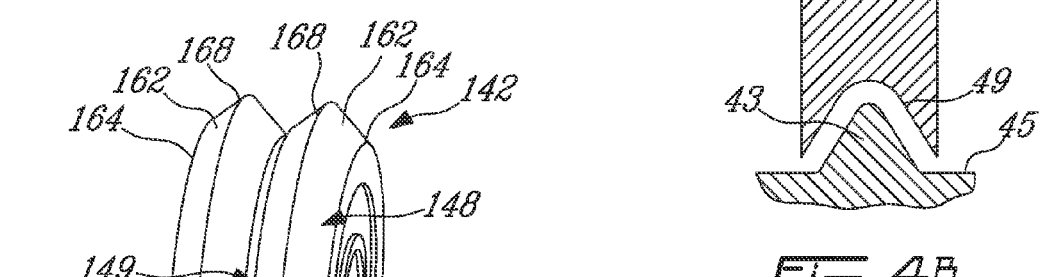
FIG-4B
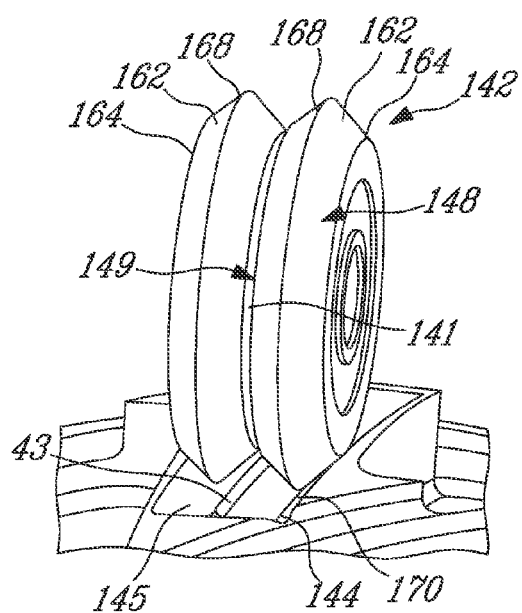
FIG-5A
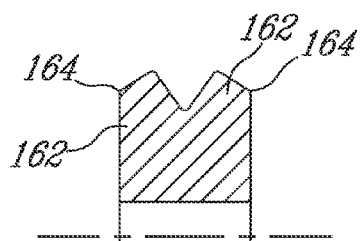
FIG-5B

BLEED VALVE

TECHNICAL FIELD

The application relates generally to bleed valves and, more particularly, to a guiding system for said bleed valves.

BACKGROUND OF THE ART

To mitigate against conditions which may lead to engine surge or blow out, some gas turbine engines have incorporated bleed valves in the engine casing upstream of the combustor which, when an engine surge is imminent, open to reduce or "bleed" airflow from the gas flow path before it reaches the combustor.

Prior art bleed valves using a movable valve element can include a guide bearing which moves within a flat-bottom track, thereby guiding the movement of the valve element. The loads, as well as the radial play between the outer race of the guide bearing and the bottom surface of the flat-bottom track, can cause premature damage to both the guide bearing and the flat-bottom track.

SUMMARY

In one aspect, there is provided a bleed valve for controlling bleeding of a working fluid through an aperture of a fluid conduit, the bleed valve comprising: a piston having a sealing member, the piston being displaceable between a first position where the sealing member seals the aperture, and an opposed second position wherein the sealing member is spaced apart from the aperture to allow the working fluid therethrough; a guiding assembly including at least one guide wheel mounted to the piston and being displaceable therewith along a guide rail, the guide wheel having an outer circumferential rolling surface having a guide groove extending inwardly therefrom, the guide rail including a elongated rail surface having a guide protrusion extending away therefrom along a length of the rail surface, the guide groove and the guide protrusion being complementary and in rolling contact with one another; and a displacement mechanism engaged to the piston to displace the piston between the first and the second positions.

In another aspect, there is provided a compressor for a gas turbine engine, the compressor comprising: a compressor housing including concentric inner and outer annular walls defining an annular gas flow path therebetween, the compressor housing defining at least one bleed port extending through the housing in fluid communication with the gas flow path; at least one compressor rotor having a set of rotatable blades extending through the flow path, the bleed port being disposed downstream of the compressor rotor; and at least one bleed valve for controlling bleeding of a working fluid from the gas flow path through the at least one bleed port, each bleed valve being mounted to the compressor housing and including: a piston having a sealing member, the piston being displaceable between a first position wherein the sealing member closes the at least one bleed port, and an opposed second position wherein the sealing member at least partially opens the at least one bleed port; a guiding assembly including at least one guide wheel mounted to the piston and being displaceable therewith along a guide rail, the guide wheel having an outer circumferential rolling surface having a guide groove extending inwardly therefrom, the guide rail including a elongated rail surface having a guide protrusion extending away therefrom along a length of the rail surface, the guide groove and the guide protrusion being complementary and in rolling contact with one another; and a displacement mechanism engaged to the piston to displace the piston between the first and the second positions.

In a further aspect, there is provided a method for controlling bleeding of a working fluid through an aperture of a fluid conduit, the method comprising: displacing a sealing member of a bleed valve between a first position where the sealing member seals the aperture and a second position where the aperture is at least partially open; and guiding the displacement of the sealing member between the first and second positions by rolling a guide wheel of the bleed valve on a rail while a guide groove of the guide wheel is engaged with a complementary guide protrusion of the rail.

DESCRIPTION OF THE DRAWINGS

Reference is now made to the accompanying figures in which:

FIG. 3A is a schematic view of a bleed valve mounted to a compressor section of a gas turbine engine such as the one shown in FIG. 2, the bleed valve being shown in a closed position and the compressor section being shown in cross-section;

FIG. 3B is a schematic view of the bleed valve of FIG. 3A, being shown in an open position;

FIG. 4A is a schematic cross-sectional plan view of a displacement mechanism according to an embodiment, operatively mounted to the bleed valve shown in FIG. 3;

FIG. 4B is a schematic cross-sectional view of the guide wheel and rail of FIG. 4A;

FIG. 5A is a schematic perspective view of a guide wheel and a guide rail of a bleed valve, according to another embodiment; and FIG. 5B is a cross-sectional view of the guide wheel and guide rail of FIG. 5A.

DETAILED DESCRIPTION

Figure 1:
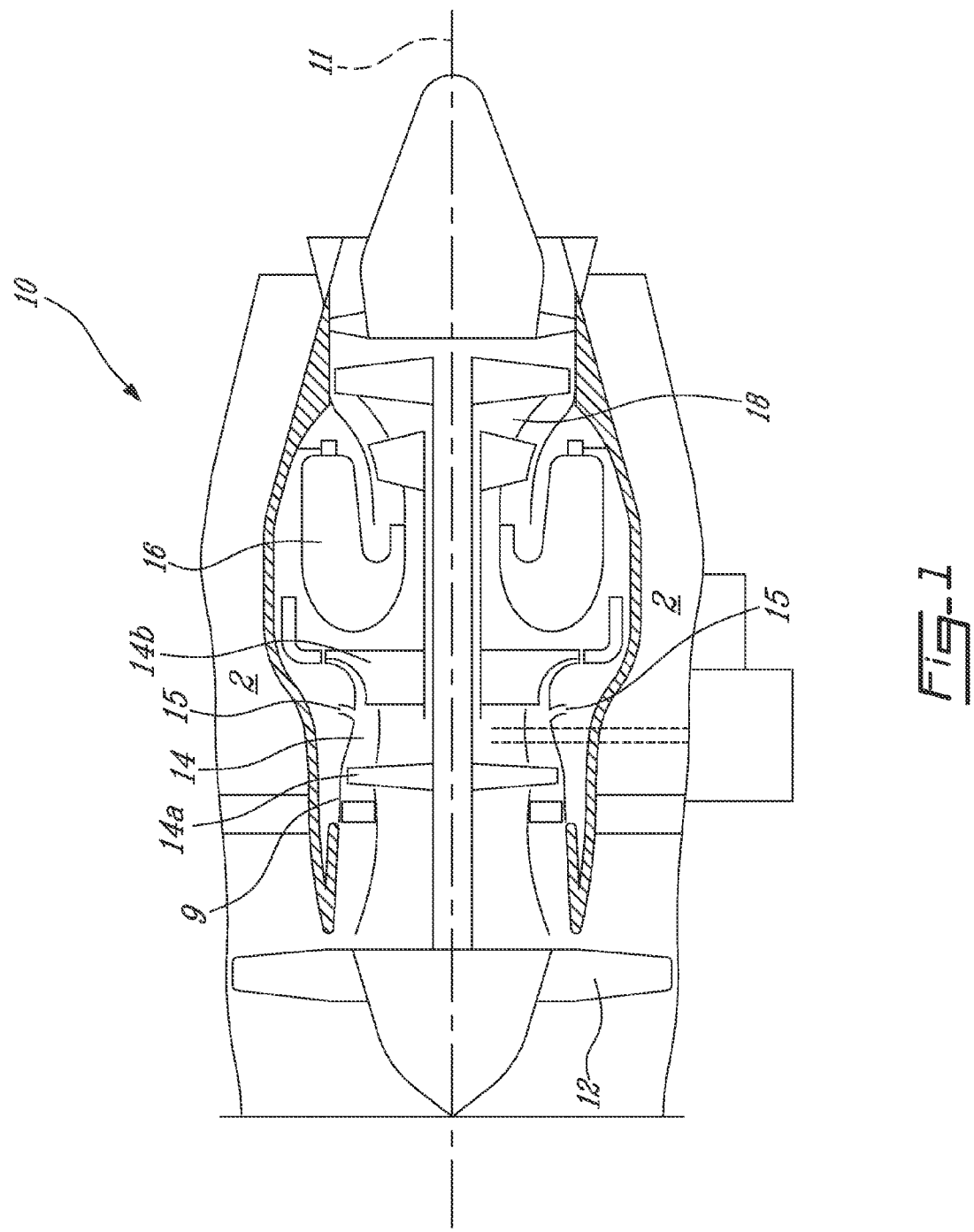
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 has a compressor housing 9 which in the embodiment shown encloses a low pressure compressor 14a and a high pressure compressor 14b, each of which may include one or more compressor stage(s). The compressor housing 9 can have one or more bleed ports 15 which allow a working fluid, such as air, to be removed or "bled" from the compressor section 14. The bleed port 15 is positioned downstream of at least one of the compressor stages. Although the bleed port 15 is shown here as being located between the low and high pressure compressors 14a, 14b, it is understood that other locations are also possible.

Figure 2:
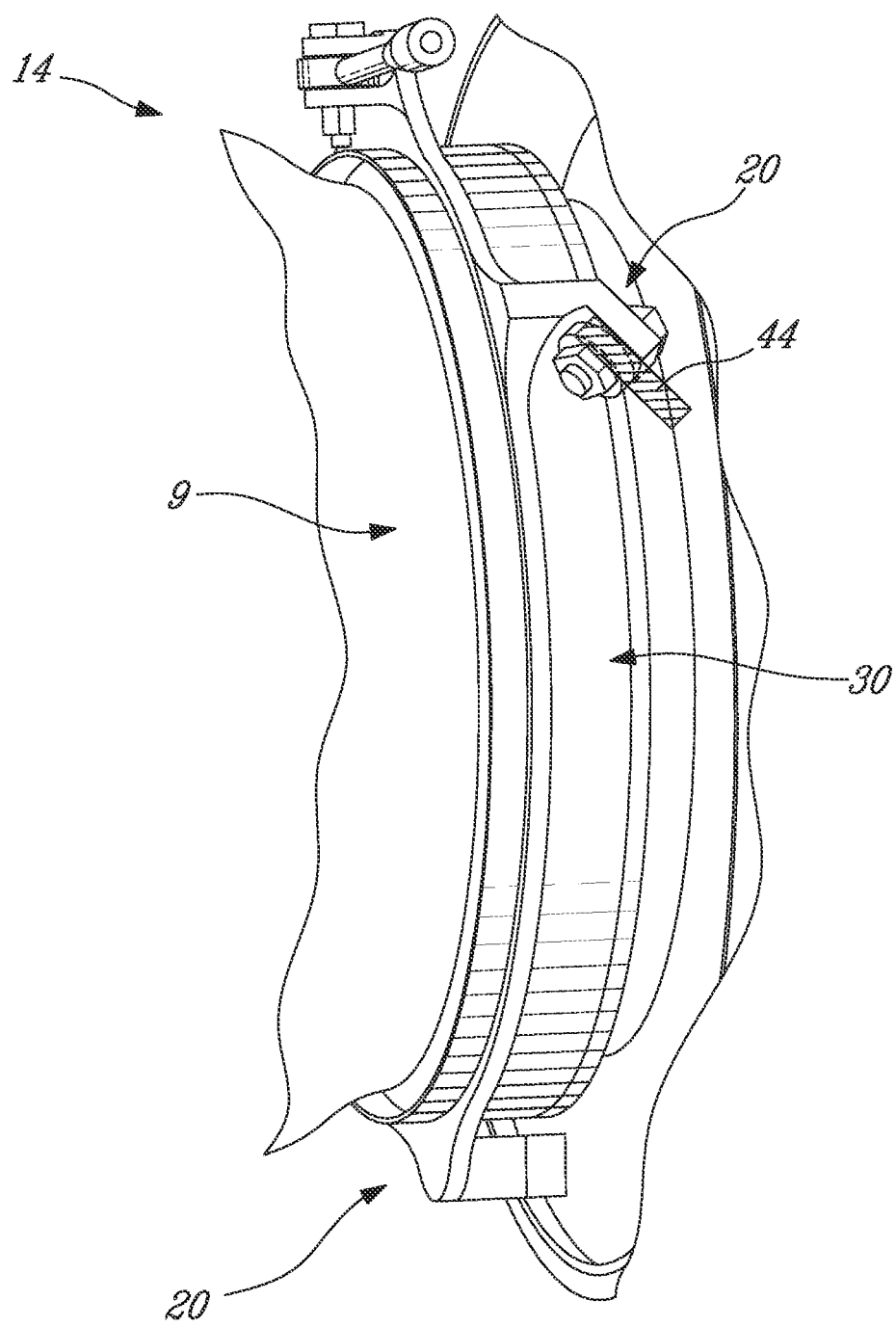
FIG. 2 is a schematic perspective view of a part of a compressor section of a gas turbine engine having bleed valves according to an embodiment.

Referring to FIGS. 1 and 2, of particular interest in the present disclosure are bleed valve(s) 20 (FIG. 2) used to control the bleeding of the working fluid from the compressor section 14. Each bleed valve 20 is mounted to the compressor housing 9 or in its vicinity, downstream of one or more of the compressor stages. When used, the bleed valve 20 can control or regulate the release or bleed of a working fluid such as air or another gas through the bleed port(s) 15. Such control can be performed automatically or passively depending on the engine's 10 operating conditions. The working fluid can be bled into an adjacent structure such as the bypass duct 2.

The number/size of bleed valve(s) 20 employed on a given compressor section 14 can vary based on numerous factors such as, but not limited to, the type of gas turbine engine 10, the size of the compressor section, and the required bleed capacity.

Referring to FIGS. 3A and 3B, the compressor housing 9 includes concentric inner and outer walls 9a, 9b which define a flow path 19 therebetween. The working fluid travels in the direction of flow arrow F along the flow path 19. In the embodiment shown, the flow path 19 extends generally axially in the direction of the center axis 11 (FIG. 1) of the gas turbine engine. A compressor stage which may be part of the low pressure compressor 14a or of the high pressure compressor 14b is shown, including a rotor having blades 17 extending across the flow path 19 and rotatable to increase the pressure of the working fluid. The compressor stage also includes an array of vanes 13 extending across the flow path 19 to guide the working fluid. It will be appreciated that other possible configurations for the flow path 19 and compressor stage are within the scope of the present disclosure.

In the embodiment shown, the bleed valve 20 is mounted to the compressor housing 9 adjacent the bleed port 15, and the bleed port 15 is defined downstream of the compressor rotor. The bleed valve 20 is shown in FIG. 3A in a closed position, thus preventing the working fluid from being bled through the bleed port 15. The bleed valve 20 is shown in FIG. 3B in an open position, thus allowing the working fluid to be bled through the bleed port 15.

The bleed port 15 is defined by a fluid conduit 23 extending from the flow path 19 with one end in fluid communication therewith through an opening defined in the outer wall 9b, and with another end defining an aperture 21 through which the working fluid is bled when the bleed valve 20 is in an open position. The conduit 23 can take different forms. For example, in the embodiment shown, a single annular conduit 23 is continuously defined around the entire perimeter of the compressor housing 9, in fluid communication with an annular plenum when the valve 20 is open. The conduit 23 may be divided by ribs defining individual ports 15 for structural purposes. Alternately, a plurality of discrete conduits may extend from the outer wall 9b, spaced apart along the circumferential periphery of the compressor housing 9, to define a plurality of bleed ports 15. The bleed port aperture may be defined directly through the wall 9b of the flow path 19, such that the walls 9a, 9b define the conduit of the bleed port 15. Other possible configurations are also within the scope of the present disclosure.

The bleed valve 20 shown generally includes a piston 30 which allows for the regulation and control of the bleeding of the working fluid from the fluid conduit 23, a guiding assembly 40 which guides the movement of the piston 30, and a displacement mechanism 60 for displacing the piston 30.

In the embodiment show, the piston 30 is annular, that is, shaped as a 360 degrees ring, and accordingly a single bleed valve 20 is defined. The amount of bleed air is thus a function of the periphery of the piston 30 and of its axial travel. Alternately, a plurality of pistons each spanning a portion of the circumference of the compressor housing 9 may be provided.

The piston 30 allows the bleed valve 20 to selectively bleed the working fluid by moving between open and closed positions to selectively open and close the aperture 21. The piston 30 can take many different forms. In the embodiment of FIGS. 3A and 3B, the piston 30 includes has an L-shaped cross-section, but it will be appreciated that the piston 30 can also take any other suitable shape which can seal and unseal the aperture 21.

The sealing and unsealing of the aperture 21 is accomplished with one or more sealing members 32. The sealing members 32 can be any plug, gasket, or other similar device which helps to seal off the aperture 21 when the piston 30 is in the closed position, and which allows passage of the working fluid through the aperture 21 when the piston 30 is in the open position. The sealing members 32 seal off the aperture 21 by engaging in a sealing contact with the walls of the fluid conduit 23. As shown in FIG. 3A, in the first or closed position, the sealing member 32 seals the aperture 21 and prevents or reduces the bleeding of the working fluid from the flow path 19 through the fluid conduit 23. As shown in FIG. 3B, in the second or open position, the sealing member 32 is disengaged from the surfaces of the conduit 23 and leaves the aperture 21 at least partially open. This disengagement of the sealing member 32 allows the working fluid to be bled from the flow path 19 through the fluid conduit 23 and aperture 21 along a bleed flow path BF, for example through an adjacent plenum and to the bypass duct 2.

Referring to FIG. 4A, the displacement of the piston 30 between the first and second positions can be achieved with the displacement mechanism 60. The displacement mechanism 60 can be any suitable device for actuating the piston 30 by placing it in motion between the first and second positions. For example, the displacement mechanism 60 can include a pneumatic or electro-mechanical actuator. Alternatively, the displacement mechanism can include a hydraulic actuator. In the embodiment shown, the displacement mechanism includes a plurality of circumferentially spaced apart hydraulic actuator levers 34 pivotally connected to the piston.

Returning to FIGS. 3A and 3B, the bleed valve 20 also has a guiding assembly 40 which guides the displacement of the piston 30 between the first and second positions. The guiding assembly 40 has one or more guide wheel(s) 42 for facilitating the displacement of the piston 30, and a guide rail 44 for guiding the displacement of each guide wheel 42. In a particular embodiment with a 360 degrees ring piston 30, three (3) guide wheels 42 and levers 34 are provided, for example equally circumferentially spaced apart. Alternately, five (5) guide wheels 42 and levers 34 may be provided. Alternate configurations are also possible.

Each guide wheel 42 is mounted to the piston 30 and is displaced with the piston 30 along the guide rail 44. The guide wheel 42 can be mounted to the piston 30 in any suitable manner which allows for them to both be displaced together. For example, in the embodiment shown and as can be best seen in FIG. 4A, a mechanical fastener 46 links the piston 30 to the guide wheel 42 along an axis of rotation of the guide wheel 42. In the embodiment shown, the actuator lever 34 acts upon the piston 30 and pushes or pulls it between the first and second positions. This pushing and pulling displacement of the piston 30 correspondingly displaces the guide wheel 42 along the guide rail 44. In the embodiment shown, the piston 30 and guide wheel 42 are displaced along parallel paths. Alternately, the guide wheel 42 and the piston 30 can be displaced along different directions.

In an embodiment, each guide wheel 42 is defined by or includes a roller bearing with an inner bearing ring and a concentric outer bearing ring rotatable relative to one another. The inner bearing ring is mounted to the piston 30, which permits the outer bearing ring to rotate relative to the piston 30. In a particular embodiment, such an arrangement can help to dissipate rotational loads acting on the piston 30, thus helping the guide wheel 42 to better absorb the loads acting thereon.

Referring to FIGS. 4A-4B, each guide wheel 42 has an outer rolling surface 48 which engages the surface of the guide rail 44 and permits the rotation and displacement of the guide wheel 42. The outer rolling surface 48 can be covered or made of a non-slip material to improve the engagement of the outer rolling surface 48 with the guide rail 44. The outer rolling surface 48 has a guide groove 49 extending inwardly into the guide wheel 42. The guide groove 49 can extend along some, or all, of the length of the periphery of the guide wheel 42.

Each guide rail 44 can be mounted to any suitable mounting surface 47 (FIGS. 3A-3B) so as to support the loads bearing upon the guide rail 44, the guide wheel 42, and the piston 30. The guide rail 44 has a rail surface 45 along which the guide wheel 42 rolls. Although shown in FIGS. 3A-3B as being positioned radially outwardly of the guide wheel 42, the guide rail 44 can alternately be positioned radially inwardly of the guide wheel 42 or in any other suitable orientation. The elongated guide protrusion 43 extends or projects away from the rail surface 45, and extends along some, or all, of the length of the rail surface 45.

The guide groove 49 and the guide protrusion 43 are complementary to one another and in rolling contact with one another. The expression "complementary" refers to the shape or configuration of both the guide groove 49 and the guide protrusion 43, in that the shape or configuration of both match each other sufficiently to permit secure contact with one another when they are engaged. For example, in the embodiment shown, the guide groove 49 has a V-shaped or substantially V-shaped groove, for example with an apex defined by a conical curvature, and the guide protrusion 43 has a complementary triangular or substantially triangular cross-section with a complementary rounded apex. The expression "rolling contact" refers to the engagement of the guide groove 49 with the guide protrusion 43, in that both engage one another to permit relative motion of one with respect to the other, which in a particular embodiment is a rolling motion.

In a particular embodiment, the complementary groove 49 and protrusion 43 can allow for an improved rolling and secure contact between the wheel 42 and track 44 when compared to conventional flat-bottom tracks. Since the guide wheel 42 can ride on a smooth and partially conical curvature, the loads acting on the guide wheel 42 in a direction of the axis 11 of the engine 10 may be reduced, and the radial loads can help to center the guide wheel 42 on the guide rail 44, thus helping to better guide and position the piston 30 of the bleed valve 20.

The above-described complementarity of the guide groove 49 and the guide protrusion 43 is not limited to "V" or triangular shapes, and it will be appreciated that other possible configurations or shapes for both the guide groove 49 and the guide protrusion 43 are within the scope of the present disclosure. Furthermore, the guide wheel 42 and the guide rail 44 can each have one or more guide grooves 49 and guide protrusions 43, respectively.

FIGS. 5A and 5B provide an example of an alternative configuration for the guide wheel 142. The guide groove 149 is defined along only part of the axial length of the rolling surface 148, such that the rolling surface 148 includes two circumferentially extending groove edges 168, and a circumferential surface portion 162 extending on each side of the groove 148 away from a respective one of the groove edges 168, such that the groove 149 is defined between the two surface portions 162. The surface portions 162 are inclined with respect to the axial direction of the wheel 142, such as to be angled radially downwardly toward the edges 164 of the wheel. The groove edges 168 thus define the radially outermost points of the wheel 142, and the wheel 142 as a W-shaped or substantially W-shaped profile, with a rounded groove apex 141.

The guide rail 144 includes elongated guide walls 170. Each guide wall 170 can extend along the length of an edge of the rail surface 145, and extend away from the rail surface 145 so as to define a boundary for guiding the guide wheel 142. In the embodiment shown, the guide walls 170 form an obtuse angle with respect to the rail surface 145, such that the guide rail 144 has a W-shaped or substantially W-shaped profile.

The guide rail 44, 144 can have different orientations. Returning to FIG. 4, in the embodiment shown, the guide protrusion 43 extends at a guide rail angle α with respect to the center axis 11 of the gas turbine engine 10, when viewed in a plane perpendicular to a line extending radially between the center axis 11 and the guide protrusion 43 (plane of the Figure). In a particular embodiment, the guide rail angle α is at least 45° and at most 65°. In a particular embodiment, the guide rail angle α is about 46°. In another particular embodiment, the guide rail angle α is about 55°. In a particular embodiment, the guide rail angle α is sufficiently small so as to avoid using too long of an actuator lever 34 to move the piston 30, and is sufficiently large so as to avoid imposing higher loads on the actuator lever 34.

The length of the guide rail 44 and guide protrusion 43 can vary as a function of other parameters of the bleed valve 20. For example, in a particular embodiment, the guide protrusion 43 has first and second extremities which define the length upon which the wheel 42 can be displaced, and this length or distance is at least, and in a particular embodiment equal or approximately equal to, the distance between the first and second positions of the piston 30.

In use, and in a particular embodiment, the bleeding of the working fluid through the aperture 21 of the fluid conduit 23 is thus controlled by displacing the sealing member 32 of the bleed valve 20 between the first or closed position where the sealing member 32 seals the aperture 21 and the second or open position where the aperture 21 is at least partially open, and guiding the displacement of the sealing member 32 by rolling the guide wheel 42, 142 while the guide groove 49, 149 is engaged with the complementary guide protrusion 43, 143.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A bleed valve for controlling bleeding of a working fluid through an aperture of a fluid conduit, the bleed valve comprising:
   a piston having a sealing member, the piston being displaceable between a first position where the sealing member seals the aperture, and an opposed second position wherein the sealing member is spaced apart from the aperture to allow the working fluid therethrough;
   a guiding assembly including at least one guide wheel mounted to the piston and being displaceable therewith along a guide rail, the guide wheel having an outer circumferential rolling surface having a guide groove extending inwardly therefrom, the guide rail including an elongated rail surface having a guide protrusion extending away therefrom along a length of the rail surface, the guide groove and the guide protrusion being complementary and in rolling contact with one another; and
   an actuator engaged to the piston to displace the piston between the first position and the second opposed position.

2. The bleed valve as defined in claim 1, wherein the guide groove is a V-shaped groove and the guide protrusion has a triangular cross-section.

3. The bleed valve as defined in claim 1, wherein the guide groove is defined between two circumferentially extending groove edges, the outer rolling surfaces including a respective circumferential surface portion extending on each side of the groove away from a respective one of the groove edges, the circumferential surface portions being inclined with respect to an axial direction of the wheel such that the groove edges define the radially outermost points of the wheel.

4. The bleed valve as defined in claim 1, wherein the guide rail comprises a respective elongated guide wall bordering each of two opposed elongated edges of the rail surface, the guide walls being angled with respect to the rail surface.

5. The bleed valve as defined in claim 1, wherein the guide protrusion is parallel to a path of the piston between the first position and the second opposed position.

6. The bleed valve as defined in claim 1, wherein the guide wheel comprises a bearing.

7. The bleed valve as defined in claim 1, wherein the guide protrusion further comprises a first extremity and an opposed second extremity, the first and second extremities being separated by a distance equivalent to a distance between the first and second positions.

8. The bleed valve as defined in claim 1, wherein the actuator includes a hydraulic actuator lever having one end engaged to the piston to displace the piston between the first position and the second opposed position.

9. A compressor for a gas turbine engine, the compressor comprising:
   a compressor housing including concentric inner and outer annular walls defining an annular gas flow path for circulating a working fluid, the compressor housing defining
   at least one bleed port extending through the housing in fluid communication with the gas flow path;
   at least one compressor rotor having a set of rotatable blades extending through the flow path, the bleed port being disposed downstream of the compressor rotor; and
   at least one bleed valve for controlling a bleeding of the working fluid from the gas flow path through the at least one bleed port, each bleed valve being mounted to the compressor housing and including:
      a piston having a sealing member, the piston being displaceable between a first position wherein the sealing member closes the at least one bleed port, and an opposed second position wherein the sealing member at least partially opens the at least one bleed port;
      a guiding assembly including at least one guide wheel mounted to the piston and being displaceable therewith along a guide rail, the guide wheel having an outer circumferential rolling surface having a guide groove extending inwardly therefrom, the guide rail including an elongated rail surface having a guide protrusion extending away therefrom along a length of the rail surface, the guide groove and the guide protrusion being complementary and in rolling contact with one another; and
      an actuator engaged to the piston to displace the piston between the first position and the second opposed position.

10. The compressor as defined in claim 9, wherein the piston is annular and the at least one guide wheel includes a plurality of circumferentially spaced apart guide wheels mounted to the piston.

11. The compressor as defined in claim 9, wherein the guide groove is a V-shaped groove and the guide protrusion has a triangular cross-section.

12. The compressor as defined in claim 9, wherein the guide groove is defined between two circumferentially extending groove edges, the outer rolling surfaces including a respective circumferential surface portion extending on each side of the groove away from a respective one of the groove edges, the circumferential surface portions being inclined with respect to an axial direction of the wheel such that the groove edges define the radially outermost points of the wheel.

13. The compressor as defined in claim 9, wherein the guide rail comprises a respective elongated guide wall bordering each of two opposed elongated edges of the rail surface, the guide walls being angled with respect to the rail surface.

14. The compressor as defined in claim 9, wherein the guide protrusion is parallel to a path of the piston between the first position and the second opposed position and extends at an angle of at least 45° and at most 65° with respect to a central longitudinal axis of the compressor when viewed in a plane perpendicular to a line extending radially between the longitudinal axis and the guide protrusion.

15. The compressor as defined in claim 9, wherein the guide wheel comprises a bearing.

16. The compressor as defined in claim 9, wherein the guide protrusion further comprises a first extremity and an opposed second extremity, the first and second extremities being separated by a distance equivalent to a distance between the first and the second opposed position.

17. The compressor as defined in claim 9, wherein the actuator includes a hydraulic actuator lever having one end engaged to the piston.

18. A method for controlling bleeding of a working fluid through an aperture of a fluid conduit, the method comprising:
   actuating a sealing member of a bleed valve with an actuator between a first position where the sealing member seals the aperture and a second position where the aperture is at least partially open; and rolling a guide wheel of the bleed valve on a rail while a guide groove of the guide wheel is engaged with a complementary guide protrusion of the rail to operate the bleed valve.

19. The method as defined in claim 18, wherein the actuator is a hydraulic actuator.

* * * * *